United States Patent
England et al.

(10) Patent No.: US 11,867,304 B2
(45) Date of Patent: Jan. 9, 2024

(54) VALVE ASSEMBLIES, VALVE SEATS INCLUDING FLEXIBLE ARMS, AND RELATED METHODS

(71) Applicant: Flowserve Management Company, Irving, TX (US)

(72) Inventors: Ricky England, Sparta, TN (US); David Boles, Cookeville, TN (US)

(73) Assignee: FLOWSERVE PTE. LTD., Singapore (SG)

( * ) Notice: Subject to any disclaimer, the term of this patent is extended or adjusted under 35 U.S.C. 154(b) by 0 days.

(21) Appl. No.: 17/392,198

(22) Filed: Aug. 2, 2021

(65) Prior Publication Data

US 2021/0396325 A1    Dec. 23, 2021

Related U.S. Application Data

(63) Continuation of application No. 15/530,445, filed as application No. PCT/US2014/045610 on Jul. 7, 2014, now Pat. No. 11,149,869.

(51) Int. Cl.
*F16K 25/00*    (2006.01)
*F16K 5/06*     (2006.01)
*F16J 15/02*    (2006.01)

(52) U.S. Cl.
CPC .......... *F16K 25/005* (2013.01); *F16J 15/025* (2013.01); *F16K 5/0668* (2013.01)

(58) Field of Classification Search
CPC ...... F16K 25/005; F16K 5/0668; F16J 15/025
USPC .............. 251/170, 172, 174, 315.01–315.16
See application file for complete search history.

(56) References Cited

U.S. PATENT DOCUMENTS

| | | |
|---|---|---|
| 1,488,296 A | 3/1924 | Stevens |
| 2,191,232 A | 2/1940 | Heinen |
| 2,573,177 A | 10/1951 | Bohlen |
| 3,184,213 A | 5/1965 | Anderson |
| 3,204,924 A | 9/1965 | Bredtschneider |
| 3,380,708 A | 4/1968 | Scaramucci |
| 3,394,915 A | 7/1968 | Gachot |
| 3,401,914 A | 9/1968 | Shand |
| 3,548,858 A | 12/1970 | Wolfensperger |
| 4,061,307 A | 12/1977 | Yoshiike et al. |

(Continued)

FOREIGN PATENT DOCUMENTS

| | | |
|---|---|---|
| CN | 101776157 B | 7/2010 |
| DE | 7826192 U | 1/1979 |

(Continued)

OTHER PUBLICATIONS

Extended European Search Report from European Application No. 14897230.0, dated Dec. 12, 2017, 8 pages.

(Continued)

*Primary Examiner* — John Bastianelli
(74) *Attorney, Agent, or Firm* — PCFB LLC

(57) ABSTRACT

Valve seats include a flexible arm portion configured to seal against a portion of a valve body of a valve. A ball valve may include such valve seats. Methods of forming a seal in a ball valve include forcing a first metal valve seat into sealing contact with a first end cap and a ball valve member with a first metal flexible arm member and forcing a second metal valve seat into sealing contact with a second end cap and the ball valve member with a second metal flexible arm member.

17 Claims, 4 Drawing Sheets

(56) References Cited

U.S. PATENT DOCUMENTS

| | | |
|---|---|---|
| 4,114,856 A | 9/1978 | MacAfee et al. |
| 4,147,327 A | 4/1979 | Moran |
| 4,217,923 A | 8/1980 | Kindersley |
| 4,258,901 A | 3/1981 | Zinnai et al. |
| 4,262,688 A | 4/1981 | Bialkowski |
| 4,290,581 A | 9/1981 | Moran et al. |
| 4,541,449 A | 9/1985 | Burke et al. |
| 4,580,763 A | 4/1986 | Velan |
| 4,603,836 A | 8/1986 | Godfrey |
| 4,671,308 A | 6/1987 | Williams et al. |
| 4,750,708 A | 6/1988 | Yusko, Jr. et al. |
| 4,899,980 A | 2/1990 | Kemp |
| 4,911,407 A | 3/1990 | Paul, Jr. |
| 5,088,687 A | 2/1992 | Stender |
| 5,127,628 A | 7/1992 | Kemp |
| 5,170,989 A | 12/1992 | Kemp |
| 5,467,966 A | 11/1995 | Nicholson |
| 6,533,241 B1 | 3/2003 | Chen |
| 6,948,699 B1 | 9/2005 | Keiser |
| 8,403,296 B2 | 3/2013 | Phillips |
| 2002/0185625 A1 | 12/2002 | Gosling |
| 2007/0080315 A1 | 4/2007 | Combs |
| 2011/0024662 A1 | 2/2011 | Seveso et al. |
| 2011/0114863 A1 | 5/2011 | Nelson et al. |
| 2011/0133109 A1* | 6/2011 | Mircea ............ F16K 5/0678 251/315.01 |
| 2013/0168591 A1 | 7/2013 | Webster |
| 2017/0067565 A1 | 3/2017 | Chang et al. |

FOREIGN PATENT DOCUMENTS

| | | |
|---|---|---|
| EP | 0539656 A1 | 5/1993 |
| JP | 2011-133104 A | 7/2011 |
| WO | WO2011/071581 A1 | 6/2011 |
| WO | WO2012/059758 A1 | 5/2012 |

OTHER PUBLICATIONS

International Preliminary Report on Patentability from International Application No. PCT/US2014/045610, dated Jan. 19, 2017, 12 pages.

Search Report and Written Opinion from International Application No. PCT/US2014/045610, dated Apr. 7, 2015, 15 pages.

* cited by examiner

VALVE ASSEMBLIES, VALVE SEATS INCLUDING FLEXIBLE ARMS, AND RELATED METHODS

CROSS-REFERENCE TO RELATED APPLICATION

This application is a continuation of U.S. patent application Ser. No. 15/530,445, filed Jan. 18, 2017, which application is a national phase entry under 35 U.S.C. § 371 of International Patent Application PCT/US2014/045610, filed Jul. 7, 2014, designating the United States of America and published in English as International Patent Publication WO 2016/007127 A1 on Jan. 14, 2016, the disclosure of each of which is hereby incorporated herein in its entirety by this reference.

TECHNICAL FIELD

The present disclosure relates generally to valve seats, and, more particularly, to valve seats including a flexible arm, valve assemblies including valve seats having a flexible arm, and related methods.

BACKGROUND

Many valve types have been employed for stopping and controlling the flow of fluids in a pipe or other flow path. Each of these valves offers certain advantages while suffering from other disadvantages. Some valve types include plug valves, ball valves, stop or globe valves, angle valves, butterfly valves, and gate valves.

Ball valves comprise a rotatable ball having a bore therethrough corresponding to the fluid flow path together with a seat for sealing with the ball surface. Typical ball valves have a valve body and a valve member operatively connected to the valve body by an upstream and a downstream seal. The valve body defines a flow passage having an upstream flow-through end, a downstream flow-through end, and a valve receiving chamber located between the upstream and downstream flow-through ends of the flow passage. The valve member is located within the valve receiving chamber, and includes a throughbore that allows passage of fluid through the valve member. The seals or seats, in conjunction with the valve member and the valve receiving chamber, define a cavity around the valve member. To prevent leakage of the valve, the seals or seats are pressed against the valve member with a given or fixed sealing pressure based, at least in part, on the maximum pressure environment in which the valve may be installed.

The valve member is coupled to an actuator via a valve stem, which is selectively rotatable to rotate the valve member within the valve receiving chamber, between a fully open position and a fully closed position. Generally, in a two way valve, the fully open position occurs when the throughbore is aligned with the flow passage at zero degrees of rotation from a centerline of the flow passage and the fully closed position occurs at ninety degrees of rotation of the valve member from the centerline.

BRIEF SUMMARY

Various embodiments of the present disclosure are directed toward a valve seat including a flexible arm (e.g., a metal valve seat). Embodiments of valve seats of the present disclosure may provide enhanced sealing in valve assemblies (e.g., a ball valve assembly) by forcing the valve seat into contact with at least a portion of the valve body (e.g., an end cap) and the valve member (e.g., a ball) of the valve assembly. Such a valve seat may provide enhanced sealing between the valve member and the at least a portion of the valve body of a valve assembly by adjusting to varying tolerances in the valve assembly with the flexible arm of the valve seat and by applying a force between the valve member and the at least a portion of the valve body to enhance contact between the valve seat and both the valve member and the valve body.

In some embodiments, the present disclosure includes a valve seat. The valve seat includes an annular ring formed from a metal material. The annular ring comprises a body portion configured to seal against a valve member of a valve and a flexible arm portion configured to seal against a portion of a valve body of the valve. The body portion and the flexible arm portion are at least partially separated by a radially extending recess formed in the annular ring and the flexible arm portion is configured to force at least one portion of the valve seat into contact with at least one surface of the valve.

In additional embodiments, the present disclosure includes a ball valve assembly. The ball valve assembly includes a ball valve member having a first fluid passage formed therethrough and a valve body. The valve body includes a valve member receiving chamber housing the ball valve member, a first end cap having a second fluid passage formed therethrough and positioned on a first side of the ball valve member, and a second end cap having a third fluid passage formed therethrough and positioned on a second side of the ball valve assembly. The ball valve member is movable relative to the valve body to selectively place the first fluid passage, the second fluid passage, and the third fluid passage in fluid communication. The ball valve assembly further includes two valve seats. Each valve seat includes an annular ring formed from a metal material and comprising a body portion abutting the valve member and a flexible arm portion abutting one of the first end cap and the second end cap. The flexible arm portion forces the valve seat into contact with both the valve member and one of the first end cap and the second end cap.

In yet additional embodiments, the present disclosure includes a method of forming a seal in a ball valve. The method includes positioning a first metal valve seat between a ball valve member and a first end cap of the of the ball valve, positioning a second metal valve seat between the ball valve member and a second end cap of the of the ball valve, forcing the first metal valve seat into sealing contact with the first end cap and the ball valve member with a first metal flexible arm member of the first metal valve seat extending axially outward from a portion of the first metal valve seat, and forcing the second metal valve seat into sealing contact with the second end cap and the ball valve member with a second metal flexible arm member of the second metal valve seat extending axially outward from a portion of the second metal valve seat.

DETAILED DESCRIPTION

The illustrations presented herein are, in some instances, not actual views of any particular device, component, structure, element, or other feature, but are merely idealized representations that are employed to describe embodiments the present disclosure. Additionally, elements common between figures may retain the same numerical designation.

Figure 1:
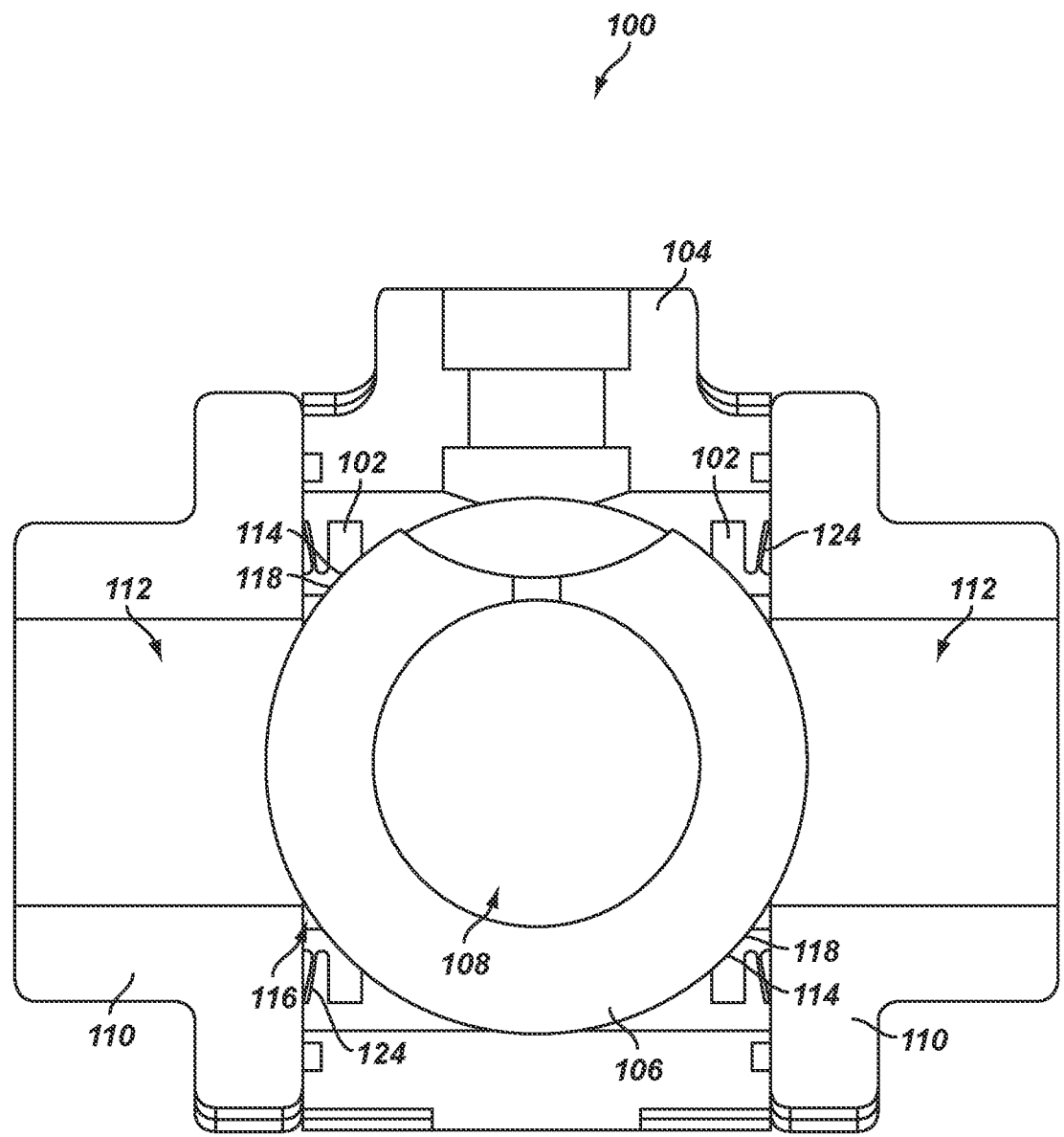
FIG. 1 is a cross-sectional side view of a valve including one or more valve seats in a closed position in accordance with an embodiment of the disclosure.
Figure 2:
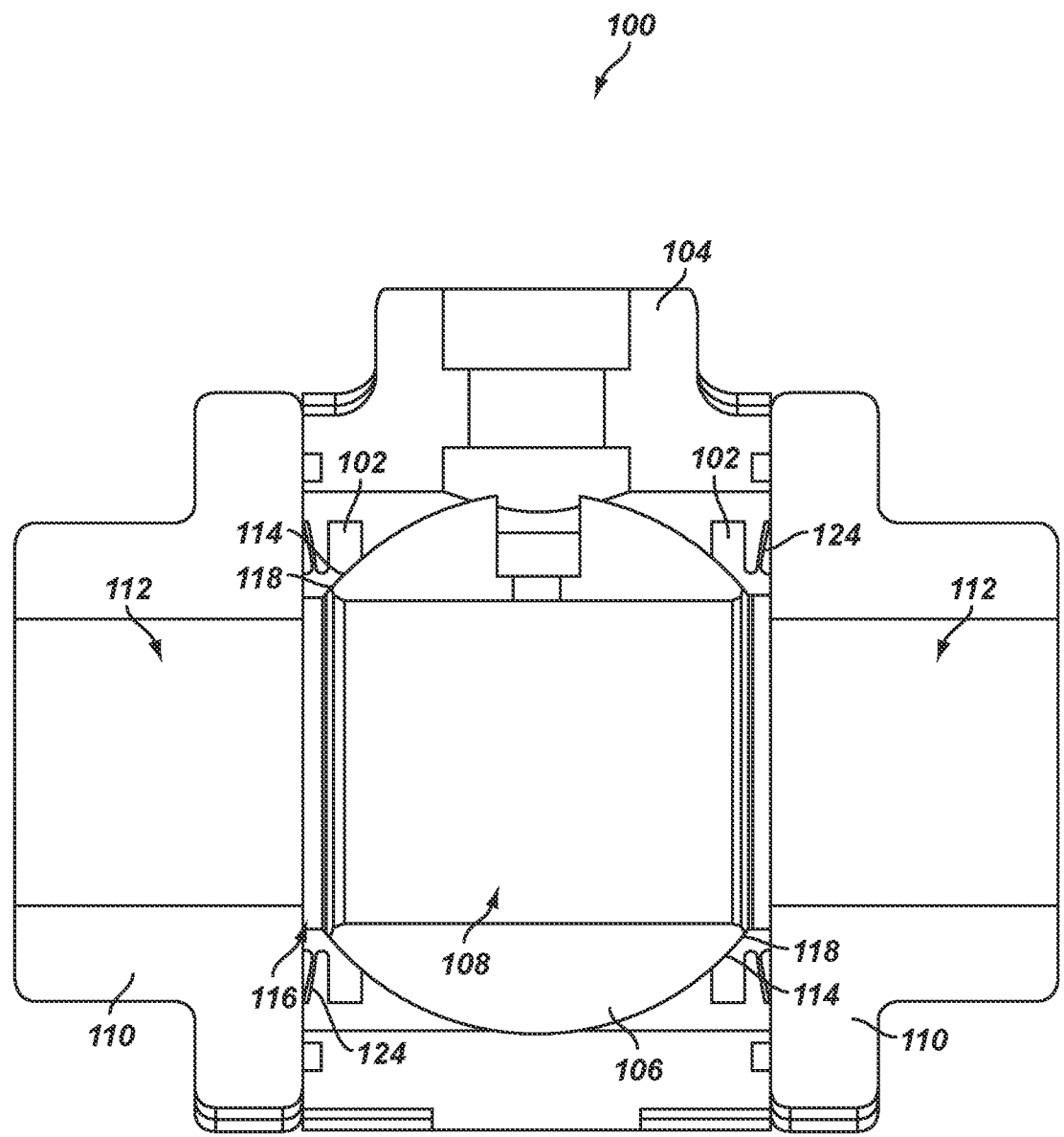
FIG. 2 is a cross-sectional side view of the valve including one or more valve seats of FIG. 1 in an open position.

FIG. 1 shows a cross-sectional side view of a valve 100 (e.g., a ball valve) including one or more (e.g., two) valve seats 102 in the closed position. FIG. 2 shows a cross-sectional side view of the valve 100 in the open position. As shown in FIGS. 1 and 2, a valve body 104 includes a valve member receiving chamber housing a valve member 106 (e.g., a ball) having a fluid passage 108 formed through the valve member 106. The valve member 106 is positioned within the valve body 104 between valve end caps 110 of the valve body 104. Each end cap 110 includes a fluid passage 112. As depicted, a valve seat 102 is positioned between each end cap 110 and the valve member 106. Each valve seat 102 (e.g., formed as an annular ring) includes a surface 114 engaging the valve member 106 and a passage 116 through the valve seat 106. Each valve seat 102 forms a substantially fluid-tight seal through engagement of the surface 114 of the valve seat 102 and a corresponding surface 118 of valve member 106. In some embodiments, one or more of the surface 114 of the valve seat 102 and the corresponding surface 118 of valve member 106 may comprises a chrome carbide flame coating.

The valve member 106 may be actuated (e.g., moved by rotation with a valve stem (not shown)) between the closed position (FIG. 1) and the open position (FIG. 2). In the fully open position, the valve member 106 is moved (e.g., rotated) so that the passage 108 in the valve member 106 forms with passages 112 and 116 a continuous fluid passage though the valve 100 (e.g., a substantially collinear fluid passage). In the closed position, the valve member 106 is rotated so that the passage 108 in the valve member 106 does not communicate with passages 112 and 116. In addition to closed and fully open, intermediate positions of valve member 106 correspond to partially closed (i.e., partially opened) valve positions, enabling the valve 100 to be used for one or more of flow control and throttling. It is noted that while the valve 100 in FIGS. 1 and 2 is depicted with a substantially linear flow path, in other embodiments, the flow path may having differing configurations (e.g., an elbow valve).

Each valve seat 102 is axially constrained (e.g., along a length of the flow path through the valve 100, along the axial direction of the annular valve seat 102 transverse (e.g., perpendicular to) the radial direction of the annular valve seat 102) by engagement of the surface 114 of the valve seat 102 by the valve member 106. For example, in both the fully opened and the closed valve positions, a valve seat 102 is axially constrained by engagement of surface 114 with the surface 118 of the valve member 106 along the entire circumference of valve seat 102. In a partially opened or closed position, engagement of surface 114 with the surface 118 of the valve member 106 extends around only a portion of the circumference of the valve seat 102. In other words, the portion of the surface 114 of the valve seat 102 proximate the fluid passage 108 formed through the valve member 106 is not axially constrained.

The valve seat 102 includes an arm portion (e.g., a flexible arm portion 124) positioned on an outer portion (e.g., an axially outer portion) of the valve seat 102. As discussed below in greater detail, the flexible arm portion 124 may act to force (e.g., bias) one or more portions of the valve seat 102 against (e.g., into contact with) one or more surfaces of the valve 100.

In some embodiments, the valve seat 102 may be formed from a metal material (e.g., to provide a metal-to-metal seal). For example, the valve seat 102 may comprise steel, chrome, iron, metal particle matrix composites, stainless steel (17-4 stainless steel), or combinations thereof. In some embodiments, the valve seat 102 may be comprised (e.g., consist of) entirely a metal material.

Figure 3:
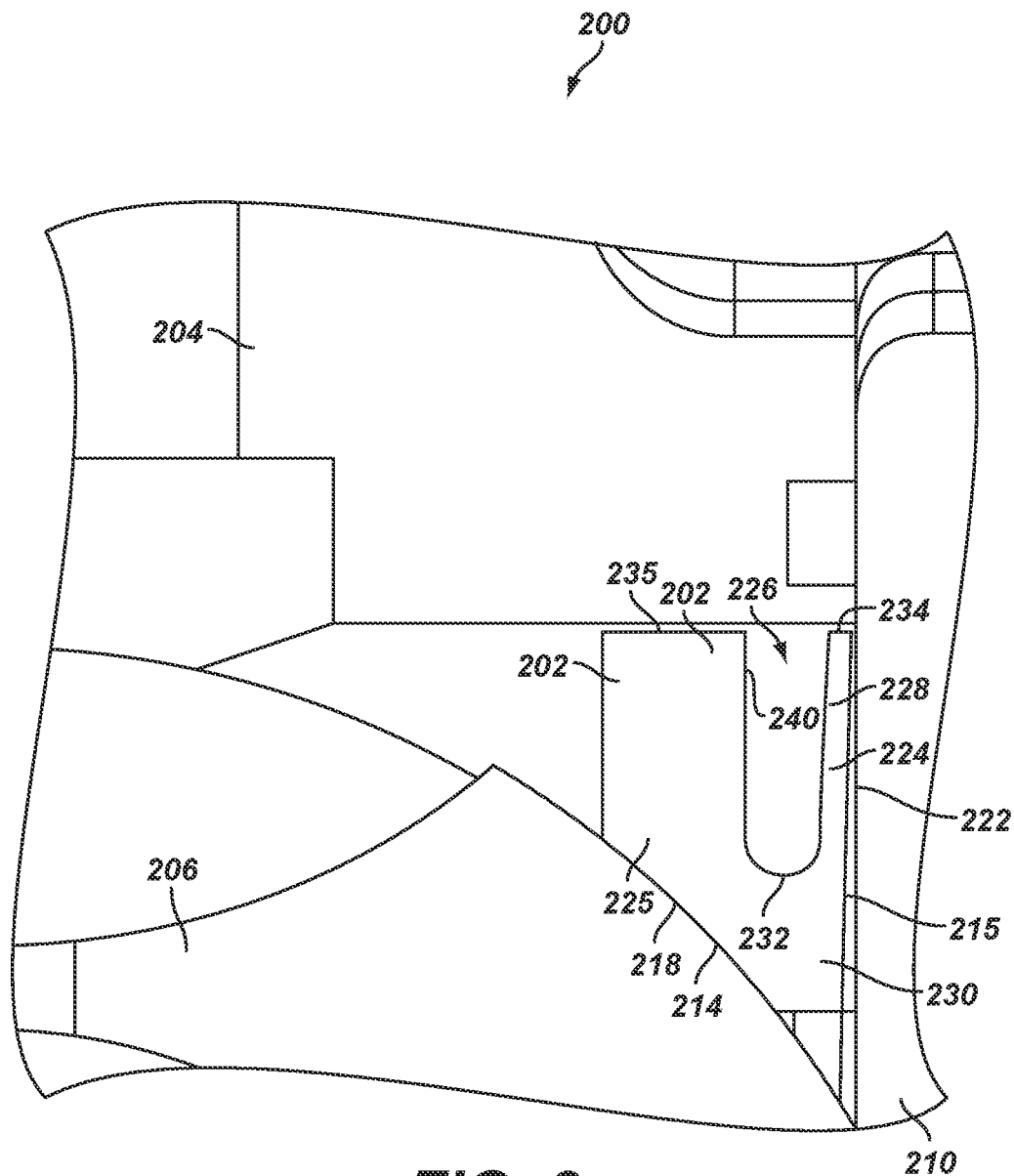
FIG. 3 is an enlarged, partial cross-sectional side view of a valve including one or more valve seats in accordance with an embodiment of the disclosure.

FIG. 3 is an enlarged cross-sectional side view of a valve 200 including a valve member 206 and two valve seats 202 that may, in some embodiments, be similar to the ball valve 100 discussed above with relation to FIGS. 1 and 2. In other embodiments, the valve 200 may comprise a different valve such as, for example, plug valves, ball valves, stop or globe valves, angle valves, butterfly valves, and gate valves.

As shown in FIG. 3, the valve seat 202 is positioned between the valve member 206, a valve body 204, and an end cap 210 of the valve body 204. The valve seat 202 may provide a seal between two or more components of the valve 200. For example, the valve seat 202 may provide a seal between the valve seat 202 (e.g., surface 214 of the valve seat 202) and a surface 218 of the valve member 206 and a seal between the valve seat 202 (e.g., surface 215 of the valve seat 202) and a surface 222 of the end cap 210.

The valve seat 202 includes an arm portion (e.g., a flexible arm portion 224) positioned on an outer portion (e.g., an axially outer portion) of the valve seat 202. As depicted, the flexible arm portion 224 may be partially separated from a body portion 225 of the valve seat 202 by recess 226. The flexible arm portion 224 may act to force (e.g., bias) one or more portions of the valve seat 202 against one or more surfaces of the valve 200. For example, the flexible arm portion 224 may be formed to extend outward (e.g., axially outward) from the valve seat 202. In other words, a first portion 228 of the valve seat 202 (e.g., a radially outward and axially outermost portion) positioned proximate the end cap 210 of the valve 200 may extend further in the axial direction than a second portion 230 of the valve seat 202 (e.g., a radially inward and axially outermost portion) positioned proximate the valve member 206 (e.g., the valve member interface surface 218). Such a configuration may act to force one or more of the flexible arm portion 224 of the valve seat 202 into the valve end cap 210 and the valve seat 202 into the valve member 206 in order to enhance the sealing between the valve seat 202 and one or more of the valve end cap 210 and the valve member 206.

In some embodiments, at least a portion of the flexible arm portion 224 (e.g., a majority of the flexible arm portion 224) may have a relatively large aspect ratio between the length of the flexible arm portion 224 and the width of a majority of the flexible arm portion 224 (e.g., the majority of the portion of the flexible arm portion 224 with the exception of the wider, proximal portion of the flexible arm portion 224 that is positioned proximate an innermost portion 232 (e.g., apex) of the recess 226). For example, as shown in FIG. 3, the length of the flexible arm portion 224 and the width the majority of the flexible arm portion may have an aspect ratio of at least 10:1 (e.g., 15:1, 20:1, 25:1, 30:1, 35:1, or greater). In other words, the length of the flexible arm portion 224 may be at least ten times (10×) larger (e.g., fifteen times (15×), twenty times (20×), twenty-five times (25×), thirty times (30×), thirty-five times (35×), or larger) than the width the majority of the flexible arm portion. Such an aspect ratio may allow the flexible arm portion 224 of the valve seat 202 (e.g., a metal flexible arm portion 224 of a metal valve seat) to be substantially elastically displaced (e.g., toward the body 225 of the valve seat 202) without substantially deforming the flexible arm portion 224 of the valve seat 202. Further, the elastic deformation of the flexible arm portion 224 will act to bias the flexible arm portion 224 back toward its original, unbiased position, thereby forcing the flexible arm portion 224 into the valve body 204.

In some embodiments, the majority of the flexible arm portion 224 may be tapered. For example, the majority of the flexible arm portion 224 may taper from a first width (e.g., 0.016 inches (0.4064 millimeter)) to a second, smaller width (e.g., 0.012 inches (0.3048 millimeter)). In other embodiments, the majority of the flexible arm portion 224 may be have a substantially uniform or constant (e.g., equal) width.

As mentioned above, the outermost portion 234 (e.g., the distal end) of the flexible arm portion 224 may be positioned to extend outward (e.g., axially outward) from the valve seat 202. Such a displacement of the outermost portion 234 of the flexible arm portion 224 of the valve seat 202 may enable the flexible arm portion 224 to at least partially compensate for tolerances (e.g., maximum tolerances) within the valve 200 to facilitate contact between the valve seat 202 and the valve body 204 and the valve seat 202 and the valve member 206 even at a low pressure environment in the valve 200. For example, the flexible arm portion 224 may at least partially compensate for the maximum allowable distance between one or more of the valve body 204 including the end caps 210) and the valve member 206.

For example, the flexible arm portion 224 may extend outward (e.g., axially outward) from the valve seat 202 a distance greater than the at least one tolerance of the valve 200. For example, if the tolerances between one or more of the valve member 204, the valve seat 202, and the end cap 210 are summed to equal a selected dimension, the distance that the outermost portion 234 of the flexible arm portion 224 is positioned from the second radially inward portion 230 of the valve seat 202 may be selected to be greater than the dimension of the summed tolerances. Such a configuration may enable the flexible arm portion 224 of the valve seat 202 to provide a preset (e.g., initial) seal between the surface 218 of the valve member 204 and the surface 222 of the end cap 210. Such a preset seal may provide sealing between the surface 218 of the valve member 206 and the surface 222 of the end cap 210 at both high and low pressure environments in the valve 200 when the valve member is in the closed position (see, e.g., FIG. 1). For example, at low pressure, the bias provided by the flexible arm portion 224 may act to keep the valve seat 202 in contact with both the valve member 206 and the end cap 210. At high pressure, the valve member 202 (e.g., a floating ball valve member) is forced toward the end cap 210 acting to keep the valve seat 204 in contact with both the valve member 202 and the end cap 210.

In operation, the flexible arm portion 224 may be to be substantially elastically displaced (e.g., toward the body 225 of the valve seat 202) without substantially deforming the flexible arm portion 224 of the valve seat 202. For example, when fluid (e.g., high pressure fluid) acts on the valve member 206 when the valve 200 is in a closed position, the fluid may force the valve member 206 toward one end cap 210 of the valve body 204 (e.g., the downstream end cap 210). The valve member 206 may act to compress the valve seat 202 between the valve member 206 and the end cap 210, thereby displacing (e.g., elastically deforming) the flexible arm portion 224 toward the body portion 225. Once the valve member 206 is able to return to or toward its initial position, the elastic deformation of the flexible arm portion 224 will act to bias the flexible arm portion 224 back toward its original, unbiased position.

In some embodiments, the outermost portion 234 of the flexible arm portion 224 may be positioned from the second radially inward portion 230 of the valve seat 202 a distance greater than 0.01% of the inner diameter of the valve seat 202 (e.g., the diameter of the flow path through the valve 200) and 5% of the inner diameter of the valve seat 202. In some embodiments, the outermost portion 234 of the flexible arm portion 224 may positioned from the second radially inward portion 230 of the valve seat 202 a distance greater than about 0.3% and less than about 2% of the inner diameter of the valve seat 202 (e.g., between about 0.3% and 1.2%, between about 0.3% and 0.9%).

In some embodiments, the flexible arm portion 224 (e.g., a centerline of the flexible arm portion 224) may extend outward (e.g., axially outward) from the valve seat 202 at a selected angle (e.g., at an angle relative to a plane extending perpendicularly to the centerline (e.g., extending through the origin) of the valve seat 202. For example, the flexible arm portion 224 may extend from the valve seat 202 at an angle of between 3° and 15° (e.g., 3°, 7°, 8°, 10°). In some embodiments, the flexible arm portion 224 (e.g., a centerline of the flexible arm portion 224) may be offset from a first radially extending surface 240 of the body portion 225 of the valve seat 202 bounding the recess 226 at a similar angle to those discussed above.

In some embodiments, a radially outer portion (e.g., radially outermost portion 234) of the flexible arm portion 224 of the valve seat 202 may have a similar diameter as another radially outer portion (e.g., radially outermost portion 235) of the body portion 225 of the valve seat 202. For example, a diameter of the valve seat 202 at the radially outermost portion 234 of the flexible arm portion 224 may be substantially similar to (e.g., equal to) a diameter of the valve seat 202 at the radially outermost portion 235 of the body portion 225 of the valve seat 302.

Figure 4:
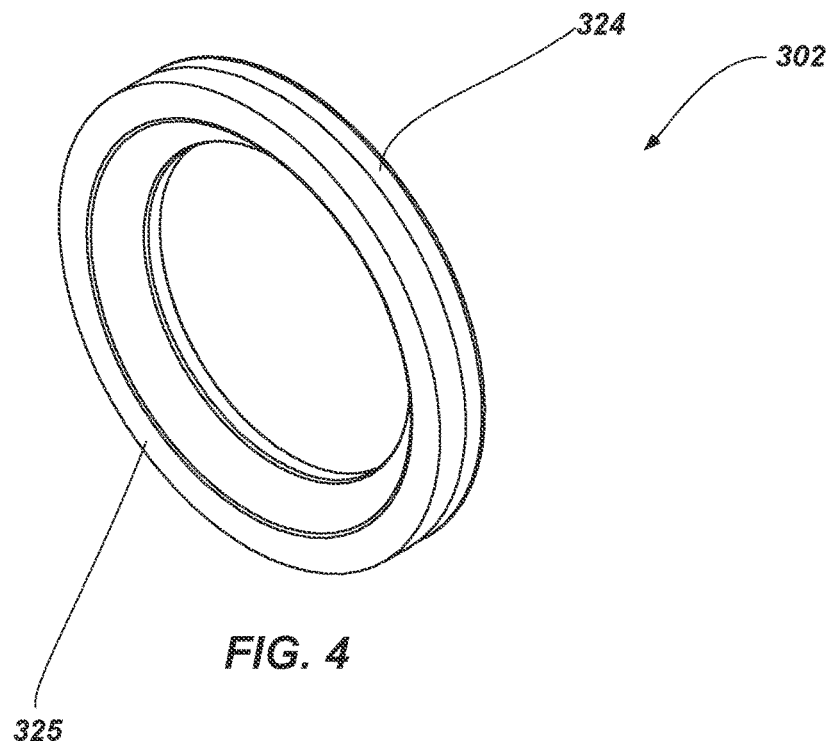
FIG. 4 is perspective view of a valve seat including a flexible arm in accordance with an embodiment of the disclosure.
Figure 5:
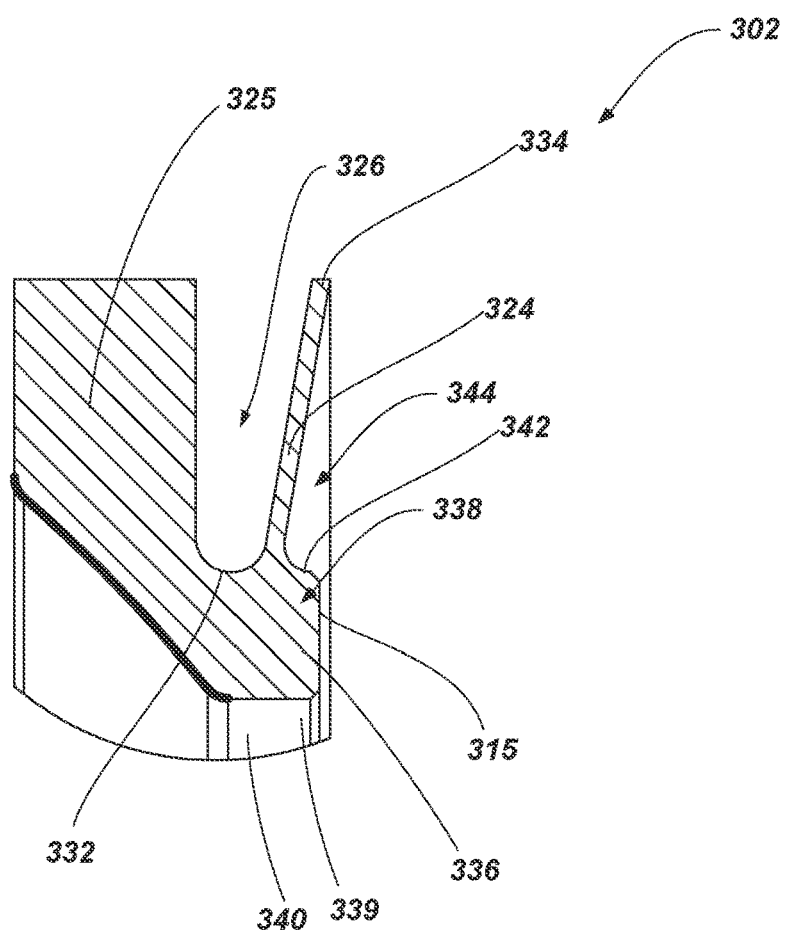
FIG. 5 is a partial enlarged cross-sectional side view of the valve seat including the flexible arm of FIG. 4.

FIG. 4 is perspective view of a valve seat 300 including a flexible arm and FIG. 5 is a partial enlarged cross-sectional side view of the valve seat shown in FIG. 4. In some embodiments, the valve seat may be similar to the valve seats 102, 202 discussed above with relation to FIGS. 1 through 3. As shown in FIGS. 4 and 5, the valve seat 302 includes a flexible arm portion 324 positioned on an outer portion (e.g., an axially outer portion) of the valve seat 302. As discussed above, the flexible arm portion 324 may act to bias one or more portions of the valve seat 302 against one or more surfaces of a valve.

The valve seat 302 includes a stop 336 positioned on an axially outer portion 338 of the valve seat 302. The stop 336 may be formed as a protrusion extending from the valve seat 302 in order to engage with a surface of a valve (e.g., surface 222 of the valve body 204 as shown in FIG. 3). The stop 336 may act to form a seal between the valve seat 302 and the surface 222 of the valve body 204 (FIG. 3).

The stop 336 acts to space the valve from the surface 222 of the valve body 204 (FIG. 3) in order to limit the amount of displacement of the flexible arm portion 324 (e.g., when the valve seat 302 is exposed to relatively high pressure environments within the valve). For example, with valve seat 302 including the stop 336, only surface 315 of the stop 336 and an outer portion 334 of the flexible arm portion 324 contact a corresponding surface of the end cap 110 (see, e.g., FIG. 1) when the valve member 102 (e.g., a floating ball) is exposed to relatively high pressure environments within the valve 100. In contrast, and as shown in FIG. 3, the majority of surface 215 of valve seat 202 will contact surface 222 of the end cap 210 when the valve member 202 (e.g., a floating ball) is exposed to relatively high pressure environments within the valve 200. Such an embodiment including the stop 336 may prevent the flexible member 324 from over-stressing and plastically deforming.

Referring back to FIG. 5, as depicted, a second recess 344 may be formed in the axially outer portion of the valve seat 302. For example, the second recess 344 may extend between a radially outer portion 334 of the flexible arm portion 324 and the stop 336.

In some embodiments, a radially inner portion 339 of the stop 336 may have a similar diameter as a radially inner portion 340 of the valve seat 302. For example, the radially inner portion 339 of the stop 336 may be coextensive with (e.g., planar) the radially inner portion 340 of the valve seat 302.

In some embodiments, a radially outer portion 342 of the stop 336 may have a similar diameter as a recess 326 formed in the valve seat 302, which separates the flexible arm portion 324 from a body portion 325 of the valve seat 302. For example, the radially outer portion 342 of the stop 336 may be positioned proximate (e.g., at a substantially similar diameter) to an innermost portion 332 (e.g., apex) of the recess 326. In other embodiments, the radially outer portion 342 of the stop 336 may be radially offset from the innermost portion 332 of the recess 326.

Embodiments of the present disclosure may provide valve seats and valves that provide more robust sealing within the valve during both high pressure and low pressure environments. The biasing of the flexible arm portion of the valve seat enables the valve seat to seal between the valve member and the valve body (e.g., the end cap) without the need for additional spring in the valve seat, as is common in conventional metal valve seats. Such valve seats may provide a metal valve seat with a metal biasing flexible arm as opposed to other polymer type seats, which polymer type seats are not able to withstand, for example, higher pressure and/or more caustic environments than metal seats.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and equivalents, of the claims which follow.

What is claimed is:

1. A method of forming a seal in a ball valve, the method comprising:
    positioning a first metal annular valve seat between a ball valve member and a first end cap of a valve body of the ball valve;
    positioning a second metal annular valve seat between the ball valve member and a second end cap of the valve body of the ball valve;
    forcing the first metal valve seat into sealing contact with the first end cap and the ball valve member with a first metal flexible arm of the first metal valve seat, the first metal flexible arm gradually extending axially outward relative to a centerline of the first metal seat from a base of the first metal flexible arm at a body portion of the first metal valve seat to a distal end of the first metal flexible arm the base and the first metal flexible arm of the first metal valve seat being separated by a recess;
    selecting the first metal flexible arm to have a uniform width and an aspect ratio between the length and the width of at least 11:1;
    forcing the second metal valve seat into sealing contact with the second end cap and the ball valve member with a second metal flexible arm of the second metal valve seat, the second metal flexible arm gradually extending axially outward relative to a centerline of the second metal seat from a base of the second metal flexible arm at a body portion of the second metal valve seat to a distal end of the second metal flexible arm the base and the first metal flexible arm of the first metal valve seat being separated by a recess;
    selecting the second metal flexible arm to have a uniform width and an aspect ratio between the length and the width of at least 11:1; and
    abutting and sealing against the first end cap with a stop comprising a protrusion extending from an axially outer portion of the first metal valve seat.

2. The method of claim 1, further comprising positioning a first side of the body portion of the first metal valve seat adjacent the ball valve member with a second side of the body portion bordering a recess between the body portion and the first metal flexible arm, the body portion being continuously solid from the first side adjacent the ball valve member to the second side bordering the recess.

3. The method of claim 1, further comprising spacing the axially outer portion of the first metal valve seat from the valve body with a recess positioned between a radially outer portion of the first metal flexible arm and the stop.

4. The method of claim 1, further comprising limiting an amount of displacement of the first metal flexible arm by contacting the valve body with the stop.

5. The method of claim 1, further comprising selecting a majority of the first metal flexible arm to have an aspect ratio between the length and the width of at least 15:1 and less than 35:1.

6. The method of claim 5, further comprising selecting a majority of the second metal flexible arm to have an aspect ratio between the length and the width of at least 15:1 and less than 35:1.

7. The method of claim 6, further comprising selecting the majority of the first metal flexible arm and the second metal flexible arm to exhibit the aspect ratio between the length and the width of at least 20:1 and less than 35:1.

8. The method of claim 5, further comprising selecting the majority of the first metal flexible arm to exhibit a uniform width.

9. The method of claim 5, further comprising selecting the majority of the first metal flexible arm to exhibit a tapered shape where a proximal section of the first metal flexible arm has a greater width taken in an axial direction of the first metal valve seat than a width of a distal end of the first metal flexible arm taken in the axial direction of the first metal valve seat.

10. The method of claim 1, further comprising
    forcing the ball valve member in a closed position toward the first end cap responsive to a fluid force on the ball valve member, the ball valve member contacting the first metal valve seat and deforming the first metal flexible arm.

11. A valve seat formed by the method according to claim 1.

12. A method of forming a seal in a ball valve, the method comprising:
positioning a metal annular valve seat between a ball valve member and a valve body of the ball valve, a first side of a body portion of the valve seat positioned adjacent to the ball valve member;
extending a flexible arm of the valve seat outward from a second side of the body portion of the valve seat, the body portion extending continuously in an axial direction between the first side and the second side, a majority of the flexible arm gradually extending axially outward from a second side of the body portion of the valve seat relative to a centerline of the valve seat from a base of the flexible arm at the body portion to a distal end of the flexible arm, the majority of the flexible arm having a uniform width and an aspect ratio between the length and the width of the flexible arm of at least 15:1 and less than 35:1, the body portion and the flexible arm being separated by a recess;
forcing the valve seat into sealing contact with the valve body and the ball valve member with the flexible arm of the valve seat;
overcoming a biasing force of the flexible arm of the valve seat with fluid pressure applied to the valve member to deform the flexible arm;
compressing the valve seat with the valve member.

13. The method of claim 12, further comprising
abutting against the valve body with a stop extending axially from the valve seat;
spacing a portion of the valve seat from the valve body with a recess between a radially outer portion of the flexible arm and the stop; and
limiting an amount of displacement of the flexible arm by contacting the valve body with the stop.

14. The method of claim 13, further comprising positioning a radially outer portion of the stop at a substantially similar diameter to an innermost portion of another recess extending between the flexible arm and another portion of the valve seat.

15. The method of claim 13, further comprising positioning a radially inner portion of the stop at a similar diameter as a radially inner portion of the valve seat.

16. A valve seat formed by the method according to claim 12.

17. A method of forming a seal in a ball valve, the method comprising:
positioning a metal annular valve seat between a ball valve member and a valve body of the ball valve;
extending a flexible arm of the valve seat outward from a body portion of the valve seat;
forcing the valve seat into sealing contact with the valve body and the ball valve member with the flexible arm of the valve seat;
selecting a majority of the flexible arm to exhibit a tapered shape where a proximal section of the flexible arm has a greater width taken in an axial direction of the valve seat than a width of a terminal end of the flexible arm taken in the axial direction of the valve seat, the body portion and the flexible arm of the valve seat being separated by a recess, a majority of the flexible arm exhibiting an aspect ratio between the length and the width of the flexible arm of at least 15:1 and less than 35:1;
gradually extending the majority the flexible arm of the valve seat axially outward from a portion of the valve seat relative to a centerline of the valve seat from a base of the flexible arm at the body portion to a distal end of the flexible arm;
overcoming a biasing force of the flexible arm of the valve seat with to the valve member as fluid pressure is applied to the valve member; and
compressing the valve seat with the valve member.

* * * * *